UNITED STATES PATENT OFFICE.

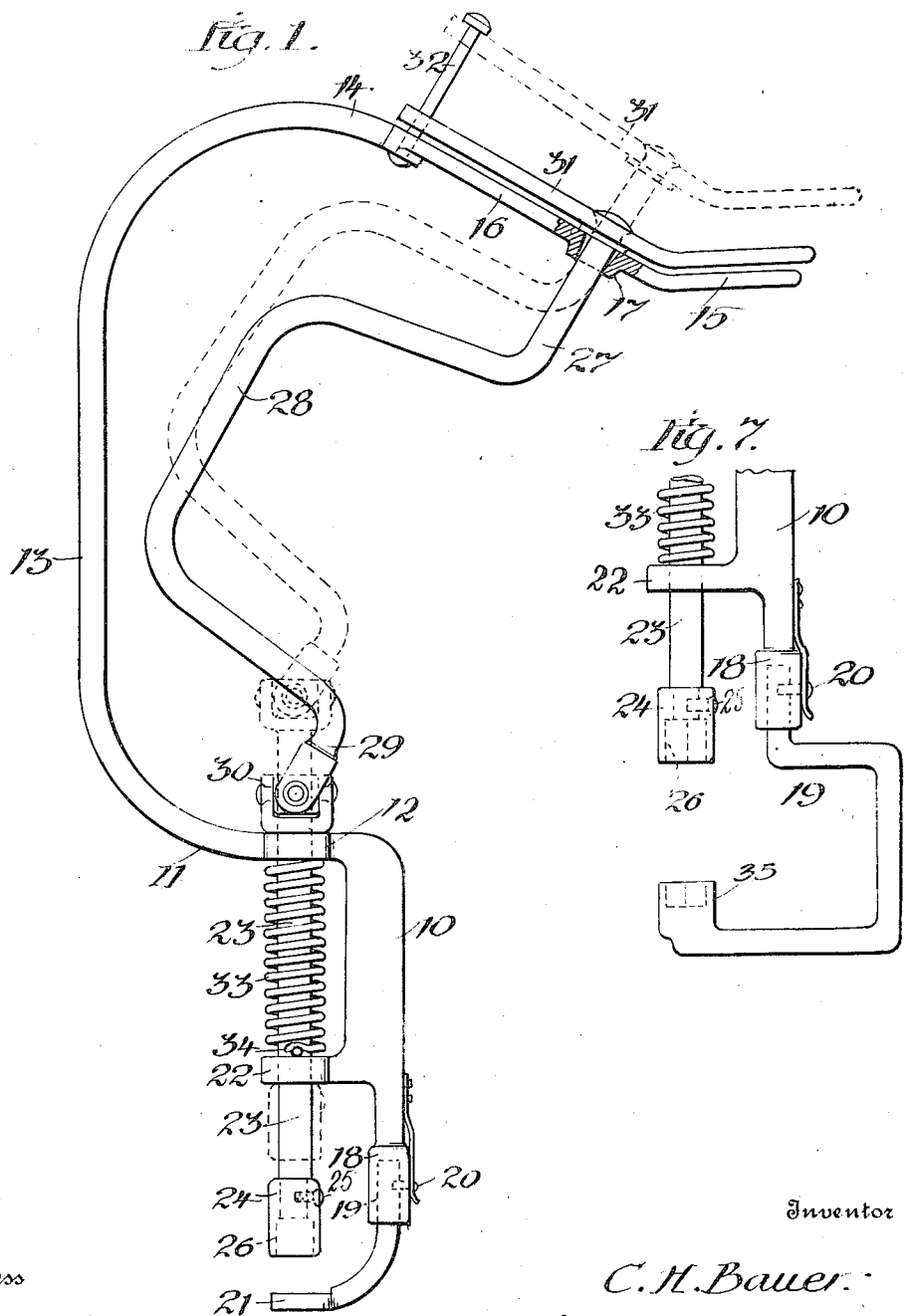

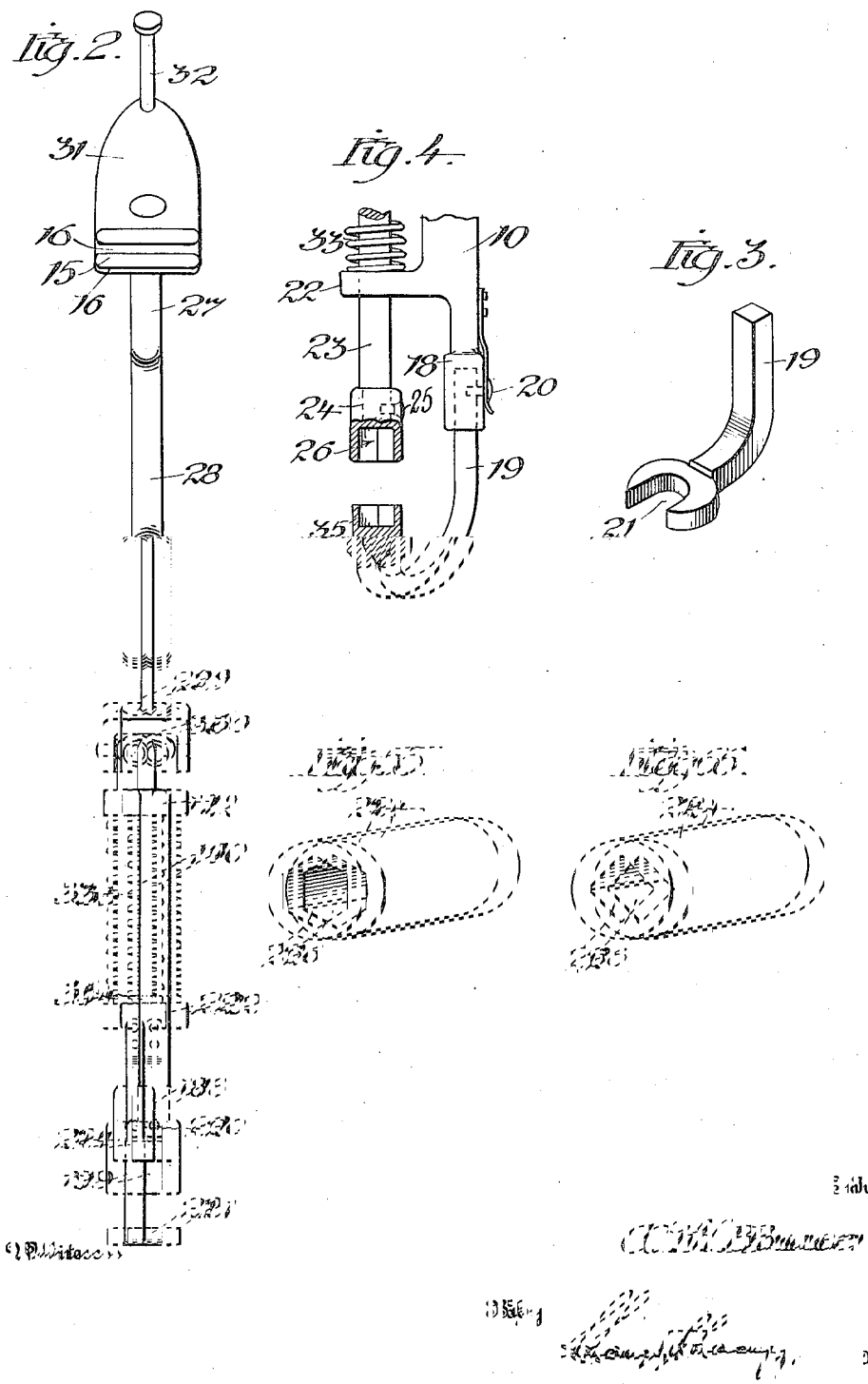

CARL H. BAUER, OF CORNING, IOWA.

WRENCH.

1,282,523.　　　　　　Specification of Letters Patent.　　Patented Oct. 22, 1918.

Application filed April 2, 1918. Serial No. 226,211.

*To all whom it may concern:*

Be it known that I, CARL H. BAUER, a citizen of the United States, residing at Corning, in the county of Adams and State of Iowa, have invented certain new and useful Improvements in Wrenches, of which the following is a specification.

This invention relates to improvements in wrench devices for removing and applying nuts to bolts in positions inaccessible by an ordinary wrench, and has for one of its objects to improve the construction and increase the efficiency and utility of devices of this character.

The improved implement is designed more particularly for use in connection with certain parts of automobiles and like vehicles in which many of the bolts and nuts which are required to be frequently detached and reinserted are located in positions inconvenient for the application of an ordinary wrench; but while the improved device is more particularly applicable to devices of this character, it is not desired to limit the invention for use in connection with any bolt and nut to which it may be applied.

In the drawings illustrative of the preferred construction of the implement:

Figure 1 is a front elevation;

Fig. 2 is a side elevation;

Fig. 3 is a detached perspective view of the detachable holding member employed in the structure illustrated in Figs. 1 and 2.

Fig. 4 is a detail view, partly in section, illustrating a modification in the form of the detachable holding member.

Fig. 5 is an enlarged detached perspective view of the nut engaging member employed for a hexagonal nut or a hexagonal bolt head.

Fig. 6 is a view similar to Fig. 1 illustrating a nut engaging member employed for a square nut or a square bolt head.

Fig. 7 is a view similar to Fig. 4, illustrating a modification in the construction of the detachable holding member.

The improved device comprises a stock including a longitudinally directed portion 10, a laterally directed portion 11 having a bearing 12, a vertically directed portion 13 offset from the body portion 10 and curving laterally at its upper end as shown at 14 and thence extended for a distance substantially at right angles to the portions 10 and 13 as shown at 15. The portion 10 is oblong transversely while the portions 11, 13 and 14 are preferably circular or rod-like transversely. The portion of the implement between the curved portion 15 and the rod-like portion 14 is widened as represented at 16 in plate-like form. At the juncture of the portions 15—16 of the implement a bearing 17 is formed, with its sides diverging outwardly as illustrated in Fig. 1, the object to be hereafter explained.

At its lower end the portion 10 of the implement is extended and provided with a socket 18. The socket 18 is designed to receive holding devices of various forms, one of which is shown in Figs. 1, 2 and 3 and another form shown in Figs. 4 and 7. The holding member illustrated in Figs. 1, 2 and 3 comprises a stock portion 19 engaging at its upper end in the socket 18 and provided with an aperture to receive a spring supported pin 20 whereby the member 19 is locked in position within the socket. The member 19 is curved laterally and terminates in a nut or bolt head engaging wrench-like member 21.

Extending laterally from the stock portion 10 is a bearing 22 in alinement with the bearing 12. A plunger member 23 is movably engaged through the bearings 12—22 and terminates in a socket 24 at its lower end, the socket being illustrated more particularly in Figs. 5 and 6. The socket 24 is provided with a cavity in one end to receive the reduced lower end of the plunger 23 and retained in position by a clamp screw 25 or other suitable device. At its free end the socket 24 is provided with a cavity 26 to receive a nut or bolt head, as the case may be. If the implement is to be employed for removing or applying hexagonal nuts or hexagonal bolt heads, the socket 26 will be hexagonal in form as illustrated in Fig. 5, but if the nut or bolt head to be engaged is square, the socket 26 will be correspondingly square as illustrated in Fig. 6. Two or more of the sockets 24 will be furnished with each implement with their cavities 26 formed to engage nuts or bolt heads of different forms and sizes. The socket members 19 and 24 are designed to engage the head or nut of a bolt and either the bolt or the nut will be held while removing the bolt from the nut or the nut from the bolt as circumstances may require.

Slidably and rotatably disposed in the bearings 17 is one end 27 of a turning member including an intermediate crank or handle 28 and a terminal 29, the latter being in alinement with the portion 27. The portion 29 of the turning member is coupled to the plunger 23 by a universal joint represented as a whole at 30. By this means it will be obvious that when the handle member 28 is rotated rotary motion will be imparted to the plunger 23.

The portion 27 of the turning member extends through the bearing 17 and in advance of the member 15—16 and is rigidly connected to a plate 31. Extending from the stock member at the juncture of the portions 14—16 is a rigid pin 32 and the plate 31 is perforated to receive the pin. A relatively strong spring 33 surrounds the plunger 23 between the portion 11 of the stock and the bearing 22 and is held from movement by a stop pin 34, the latter passing through the plunger. The spring exerts its force to maintain the socket 24 in its lower or extended position, but which will not prevent the longitudinal movement of the plunger under pressure. The plunger 23 is thus movable longitudinally any required distance within the range of the space between the socket 24 and the bearing 22 as indicated in dotted lines, and when this longitudinal movement takes place the portion 27 of the turning member will pass through the bearing 17 and cause the member 31 to assume the position shown by dotted lines in Fig. 1, the universal joint 30 permitting the required movements without causing the parts to cramp. Thus the improved implement is capable of adjustment to bolts of varying lengths. The relatively wide curved plate 31 forms a hand support or brace to enable the operator to apply the necessary pressure to hold the bolt rigidly in position while the nut is being removed.

In many forms of automobiles certain of the bolts and their nuts are in position inconvenient to be reached, but with the improved implement the nut can be engaged by one of the sockets and the head by the other, and then by rotating the turning member 28 the nut can be readily removed while at the same time the bolt is held from turning. The operation of removing the nut can thus be readily accomplished by the employment of a single implement, and nuts and bolts disposed in inconvenient position can be very quickly removed and the nuts as readily returned to the bolt.

In Fig. 4 a slight change in the construction of the member 19 is shown consisting in substituting for the socket portion 21 another form of socket 35.

It sometimes happens that bolts are employed with intervening projecting portions between the nuts and the heads, and to provide for the removal or application of the nut to bolts thus arranged, the form of holding member shown in Fig. 7 will be provided.

The improved implement is simple in construction, can be inexpensively manufactured and will be found very convenient for the purpose described.

Having thus described the invention, what is claimed as new is:

1. An implement of the class described comprising a stock member including plunger guides and a laterally directed portion, a plunger operating through said guides and having a receiving socket, a turning device connected to said plunger and including an extension slidable through said laterally directed portion, and a holding device connected to said extension externally of the laterally directed portion.

2. An implement of the class described comprising a stock including a laterally directed portion, a plunger movable relatively to said stock and carrying a receiving socket, a turning device connected to said plunger and including an extension movable through the laterally directed portion of said stock, a grip plate connected to the extension of said turning device externally of the laterally directed portion, and means carried by said stock for holding a bolt from turning.

3. An implement of the class described comprising a stock including a laterally directed portion, a plunger movable relatively to said stock and carrying a socket, a turning device connected to said plunger and including an extension movable through the laterally directed portion of said stock, a grip plate connected to the extension of said turning device, and a guide pin for said grip plate extending from said stock.

In testimony whereof I affix my signature.

CARL H. BAUER. [L. S.]